United States Patent [19]
Carteus et al.

[11] 3,860,480
[45] Jan. 14, 1975

[54] REACTOR CORE COMPONENT VIBRATION MONITRO

[75] Inventors: Marc F. M. Carteus, Montignies-Le Tilleul, Belgium; Raj Gopal, Monroeville, Pa.; Derek T. Rawle, Brussels, Belgium

[73] Assignee: Westinghouse Electric Corp., Pittsburgh, Pa.

[22] Filed: Jan. 29, 1973

[21] Appl. No.: 327,522

[52] U.S. Cl.................. 176/19 R, 73/67.2, 73/71.4
[51] Int. Cl............................................. G21c 17/00
[58] Field of Search .............. 176/19; 73/67.2, 71.4

[56] References Cited
UNITED STATES PATENTS

| | | | |
|---|---|---|---|
| 3,292,426 | 12/1966 | McCann | 73/71.4 |
| 3,437,556 | 4/1969 | Beulacque et al. | 176/19 R |
| 3,565,760 | 2/1971 | Parkos et al. | 176/19 R |
| 3,638,018 | 1/1972 | Gasper | 176/19 R |

*Primary Examiner*—Harvey E. Behrend
*Attorney, Agent, or Firm*—D. C. Abeles

[57] ABSTRACT

A method and system is disclosed which employs the neutron signals emanating from the core of a nuclear reactor to monitor reactor core component vibration, on line, during normal operation. At least two neutron detectors are disposed at diametrically opposed spaced points around the periphery of the core. The phase relationship of the spectral components of the respective signals generated by the detectors provide information as to both the magnitude and direction of the motion of the core. By subtracting the respective detector signals an out of phase signal is obtained which is proportional to the amplitude of the core component lateral vibration along the line of the detectors. Similarly, by adding the respective detector signals an in phase signal is obtained, which is proportional to the amplitude of the core component vertical vibration transverse to the line of the detectors. Additional means for normalizing the corresponding A.C. and D.C. components of the respective signals provides vibration measurements which are independent of reactor power level. The addition of a second pair of diametrically opposed neutron detectors around the periphery of the core in spaced relationship to the first pair of detectors provides information which completely defines the magnitude and direction of core vibration.

11 Claims, 3 Drawing Figures

REACTOR CORE COMPONENT VIBRATION MONITRO

BACKGROUND OF THE INVENTION

This invention pertains in general to nuclear reactor on line monitoring systems, and more particularly to such systems that monitor the magnitude and direction of core component vibration within a nuclear reactor pressure vessel.

It is becoming more and more important with the ever increasing size of nuclear reactor power generating plants to have a system which will enable the early detection of abnormal reactor core vibration. Such early detection would prevent serious damage caused by prolonged high vibration.

Previous nuclear noise measurements have been performed on a number of reactor plants for obtaining information on the vibration of reactor core components. The interpretation of the data has involved extensive analytical analysis in order to extract the relevant phase information from the nuclear signals. The complexity of the analysis has precluded obtaining continuous on line measurements of reactor core component vibration, thus enhancing the potential of core component failure due to prolonged high vibration.

SUMMARY OF THE INVENTION

Briefly, this invention provides a method and apparatus for monitoring reactor core component vibration, on line, during normal power operation of a nuclear reactor. Activity within the reactor core having a spectral component representative motion of the core is monitored and the information obtained processed to provide a measurement of core vibration.

An exemplary embodiment contemplated by this invention provides an on-line monitor which continuously measures the direction and magnitude of the vibration of the core. Employing two neutron detectors located on diametrically opposed sides of the core and utilizing the phase relationship of the spectral components of both detector signals, a measurement is obtained indicative of the vertical and lateral motion of the core relative to the plane of the detectors. The in phase signals obtained by adding the corresponding outputs from the two detectors provides a measurement of vertical core vibration, while the out of phase signals obtained by subtracting the corresponding outputs from the two detectors provides a measurement of lateral core vibration.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

In accordance with this invention the activity within the core of a nuclear reactor having a spectral component representative of the relative motion of the core is monitored to provide a measurement of core component vibration on line during normal power (10–100%) operation. In the preferred embodiment, to be described, the nuclear reactivity within the core is monitored and the neutron signals obtained are processed to indicate the direction and magnitude of the vibration of the core. Employing two neutron detectors, located at diametrically opposed sides of the core, and utilizing the phase relationship of the spectral components of both signals, measurements are obtained indicating the vertical and lateral motion of the core relative to the detector locations.

The phase relationship between the neutron signals and core vibration is analytically evidenced by a manipulation of the Boltzman transport theory at or near criticality which yields a relationship between core movement (relative to the control rods) and corresponding reactivity changes. The calibration of control rods in terms of rod worth (equivalent reactivity change) versus insertion distance is further proof of this relation.

Vertical oscillation of the core and internals causes a sustained dynamic perturbation in reactivity. The magnitude of this perturbation is a function of control rod differential worth; thus, it is a function of degree of rod insertion. For a neutron flux perturbation to be classified as a vertical oscillation of the core and internals, its magnitude should change with rod position, and signals from neutron detectors located on opposite sides of the core should be in phase.

Lateral motion of the core and internals results in variations in the neutron attenuation between the core and ion chambers positioned around the periphery of the reactor vessel. Opposing detectors, diametrically spaced around the reactor pressure vessel, provide signals which are 180° out of phase, and whose magnitude is uneffected by rod position.

Thus, horizontal motion of the core is characterized by signals, from neutron detectors on diametrically opposite sides of the core along the line of motion, being out of phase. Measurements made along two core diameters will completely define this horizontal core motion. Similarly, the vertical motion of the core is characterized by signals, from neutron detectors located on the same level around the core, being in phase.

Figure 1:
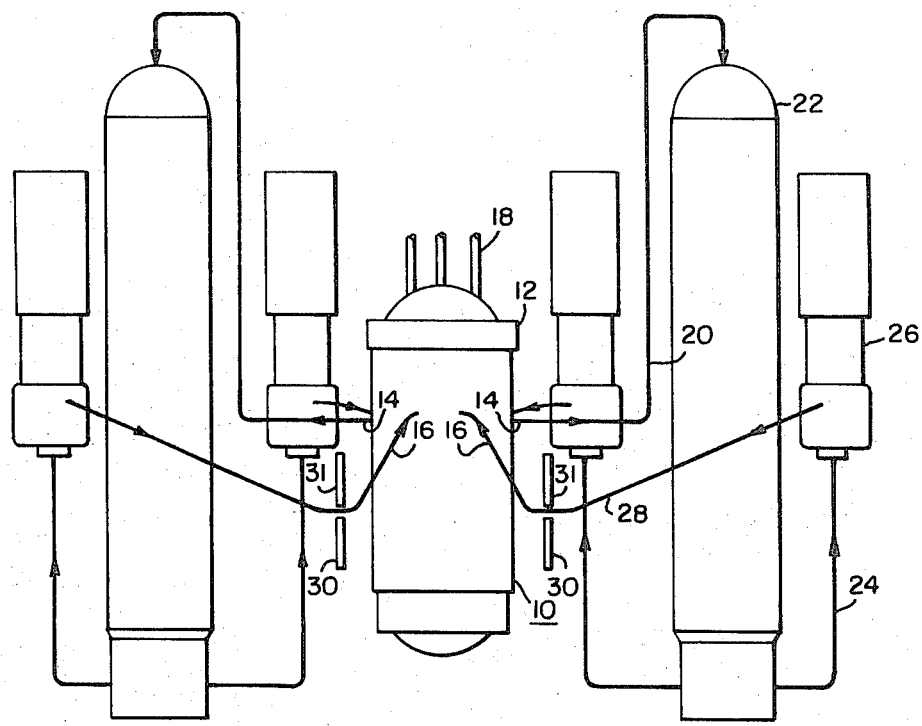
FIG. 1 is a planned view of a nuclear reactor showing the general location of detectors described in the exemplary embodiment of this invention.
Figure 2:
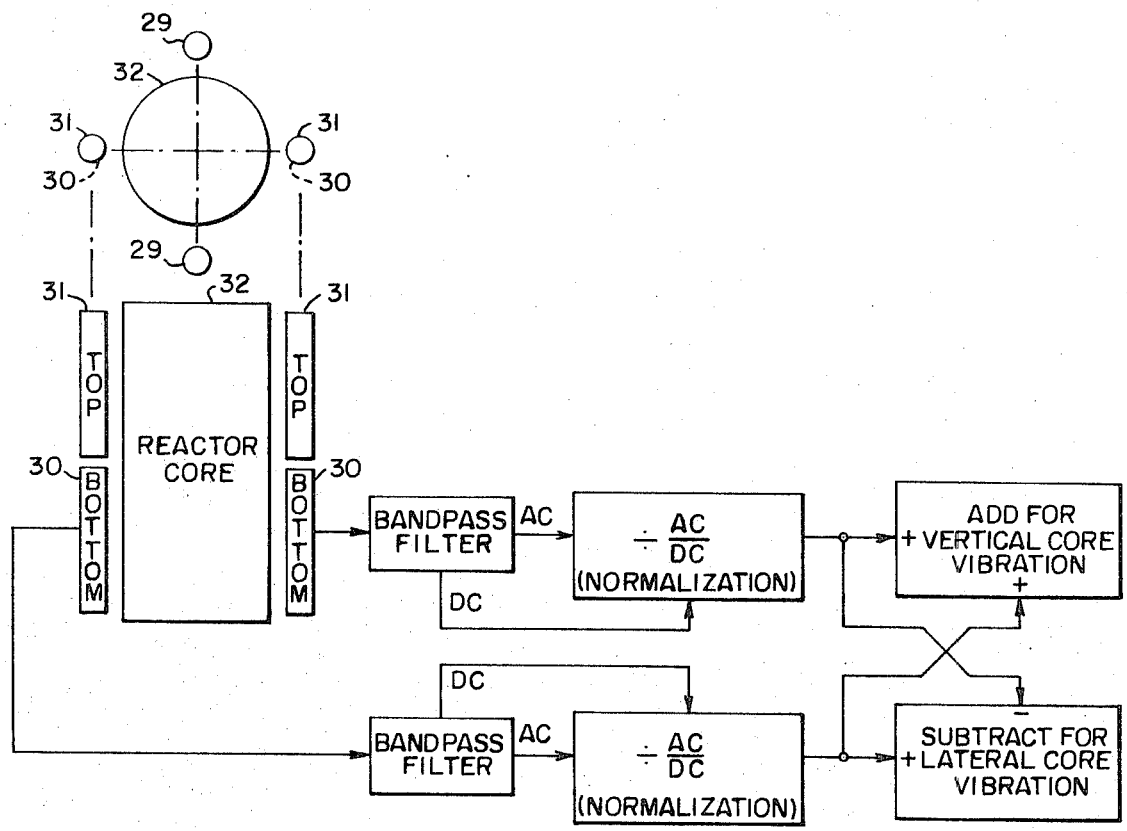
FIG. 2 is a schematic diagram illustrating one exemplary embodiment of the vibration core monitoring system of this invention.

In accordance with the preferred embodiment of this invention illustrated in FIGS. 1 and 2, an electronic circuit is provided which extracts the relevant phase information from the neutron detectors continually (on line) without the need of any elaborate computer analysis. Addition and subtraction of the conditioned signals from the neutron detectors is performed to obtain, respectively, the in phase and out of phase components of the neutron signals. These components are displayed to indicate the magnitude and the direction of core motion.

FIG. 1 shows a planned view of a nuclear power generating system of the pressurized water type illustrating the relative position of the detectors employed in this exemplary embodiment for monitoring the vibration of the reactor core.

A pressurized vessel 10 is shown which forms a presurized container when sealed by its head assembly 12. The vessel has coolant flow inlet means 16 and coolant flow outlet means 14 formed integral with and through its cylindrical walls. As is known in the art, the vessel 10 contains a nuclear core (not shown) consisting mainly of a plurality of clad nuclear fuel elements which generate substantial amounts of heat depending primarily upon the position of a control means; the pressure vessel housing 18 of which is shown. The heat generated by the reactor core is conveyed from the core by the coolant flow entering through inlet means 16 and exiting through outlet means 14. The flow exiting through outlet means 14 is conveyed through hot leg conduit 20 to a heat exchange steam generator 22. The steam generator 22 is of a type wherein the heated coolant flow is conveyed through tubes (not shown) which are in heat exchange relationship with the water which is utilized to produce steam. This steam produced by the generator 22 is commonly utilized to drive a turbine (not shown) for the production of electricity. The flow is conveyed from the steam generator 22 through conduit 24 to a pump 26 to inlet means 16. Thus it can be seen that a closed recycling primary or steam generating loop is provided with the coolant piping coupling the vessel 10, the steam generator 22, and the pump 26. The generating system illustrated in FIG. 1 has four such closed fluid flow systems or loops. The number of such systems can be understood to vary from plant to plant, but commonly two, three or four are employed.

An undesirable level of radioactive emission can occur in the unlikely event of a failure or rupture in the fuel rod cladding encasing the fissionable material within the reactor core, thereby increasing the potential of fission products from the fuel entering the coolant. Similarly, coolant blockage in the core, impairing the capacity of the coolant to dissipate the heat produced by the nuclear core, can result in a melt down of the core structure and the release of dangerous products into the coolant.

In order to safeguard against such core structural failures this invention provides a method and apparatus for monitoring reactor core component vibration, to avoid a potential source of such failures. In accordance with the preferred embodiment, this invention utilizes the detector signals generated by the neutron detectors, normally positioned around the reactor pressure vessel for measuring power. Employing a pair of these detectors located on diametrically opposite sides of the periphery of the core, and utilizing the phase relationship of the spectral components of the signals from both detectors, measurements are obtained of the vertical and lateral motion of the core indicating its magnitude and direction.

FIG. 1 illustrates the general arrangement of detectors 30 around the periphery of the reactor pressure vessel coextensive with the reactor core. The spatial location of the detectors from the core is a function of detector sensitivity; the only requirement is that the detectors be responsive to the neutron activity within the core to provide an output indicative thereof. The horizontal motion of the core, with reference to the elongated tubular pressure vessel 10, is characterized by the respective detector signals monitored at diametrically opposite sides of the core along the line of motion, being out of phase. Measurements made along two such core diameters will completely define horizontal core motion. Similarly, vertical motion of the core is characterized by signals, from the neutron detectors located on the same elevation around the core, being in phase.

FIG. 2 illustrates one embodiment of an electronic circuit capable of extracting the relevant phase information from the neutron detectors continually (on line) without the need of any elaborate computer analysis. Two sets of detectors 30 and 31 are shown, each set being positioned around the core 32, spaced 180° around the circumference of the pressure vessel. For illustrative purposes, signals from the bottom detectors are monitored. The respective detector outputs are filtered to separate the corresponding AC and DC components in a manner familiar to those skilled in the electrical art. The AC signal components are then normalized to their respective DC signal components to yield a resultant signal which is independent of reactor power. Circuits for performing such arithmetic operations are well known in the art. The respective normalized signals are then added together through use of well known electronic devices, such as operational amplifiers, to obtain the sum of the in phase portion of the two normalized signals. The resultant sum is proportional to the amplitude of the core component vertical vibration. In a similar manner, the respective normalized signals are subtracted from one another to obtain the sum of the out of phase signal components. The resultant out of phase output is proportional to the amplitude of the core component lateral vibration along the line of the detectors. If an additional two detectors 29 were spaced at diametrically opposite locations in spaced relationship to the first pair of detectors, they would provide a similar measurement, which when plotted with the measurement just obtained, would completely define the lateral motion of the core.

Figure 3:
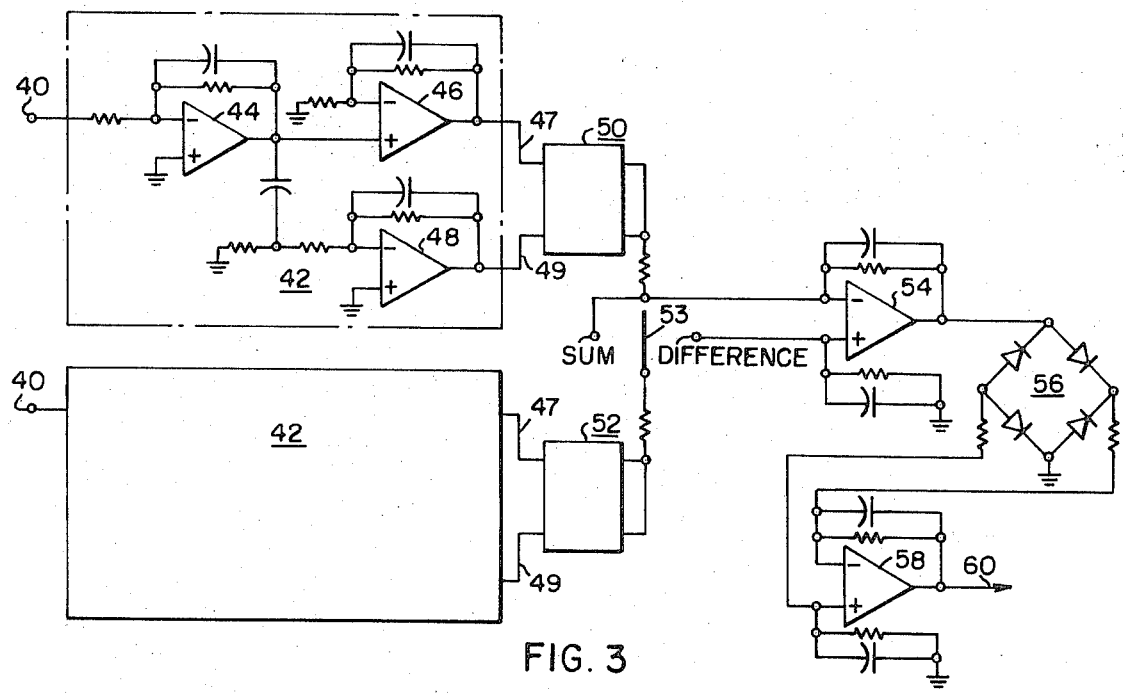
FIG. 3 is a schematic circuitry diagram of the embodiment illustrated in FIG. 2.

The circuits illustrated in block form in FIG. 2 are more specifically shown in FIG. 3. The preamplified outputs from the corresponding diametrically opposed neutron sensors are respectively provided at the input terminals 40. The circuitry generally described by reference character 42 functions as the bandpass filter illustrated in FIG. 2 to separate the corresponding AC and DC components of the respective sensor signals. Since the circuitry associated with the separate signals are redundant, only one complete circuitry train is shown in detail with the other shown in block form having corresponding reference characters. Input amplifier 44 provides some isolation and amplification to the corresponding sensor inputs which are then processed in parallel through a low pass filter 46 and a high pass filter 48. With the appropriate selection of component values shown in the respective filter feedback loops the sensor signals are separated into their AC components at outputs 49 and their corresponding DC components at outputs 47. The corresponding AC and DC signals are then normalized in an appropriate divider unit such as an anlogue divider which is a commonly available unit in the art. The two detector outputs are then available for summation or subtraction at the corresponding normalizing unit outputs generally defined by reference characters 50 and 52. A single addition and subtraction unit is illustrated by reference character 54 though it should be understood that separate units can be provided to supply each function as illustrated in FIG. 2. Switch 53 is transitioned to the sum position to connect the differential amplifiers 54 to perform the addition function and is transitioned to the difference position to accomplish the subtraction function. The output is then full wave rectified by the bridge circuit 56 to establish a signal more compatible for display. This signal is then operated upon by the integrator 58 for display at output terminal 60.

Thus, a signal representative of core vertical vibration is available at output terminal 60 when the switch 53 is transitioned to the summation position. Similarly, a signal representative of core lateral vibration is available at output terminal 60 when the switch 53 is located in the position marked difference.

Thus the preferred embodiment set forth is described with reference to an elongated tubular pressure vessel, the vessel geometry should not be considered as a limitation of this invention, but is merely provided to establish an illustrative frame of reference for the detector locations. What has previously been described as lateral vibration would generically correspond to the motion of the core along the line of the detectors. Similarly the reference to vertical vibration corresponds to the motion of the core along a line transverse to a line drawn between the two detectors. Accordingly, the detector locations should be chosen to accommodate the core motion to be measured. The resultant magnitude of the in phase and out of phase signals can then be displayed in a conventional manner such as on chart recorders to indicate the magnitude and direction of core motion.

Thus, this invention provides a method and apparatus for continuously monitoring the core vibration of a nuclear reactor; displaying its direction and magnitude during normal power operation to alarm the reactor operator of an adverse condition so that he can take corrective action before damage to the core is sustained.

We claim as our invention:

1. A nuclear reactor pressure vessel core component vibration monitor comprising:
    first means, positioned outside the core, responsive to the neutron activity occurring within the core having a spectral component representative of the relative motion of the core to provide outputs indicative thereof; and
    second circuit means communicatively coupled with said first means and analytically operable on the outputs thereof to process the outputs into a measurement indicative of core vibration.

2. The nuclear reactor pressure vessel core component vibration monitor of claim 1 wherein said first means comprises:
    a first detector responsive to the neutron activity emanating from the core to provide an electrical output representative thereof, said first detector positioned adjacent the core along the periphery of the pressure vessel; and
    a second detector responsive to the neutron activity emanating from the core to provide an electrical output representative thereof, said second detector positioned adjacent the core along the periphery of the pressure vessel diametrically opposite said first detector.

3. The neclear reactor pressure vessel core component vibration monitor of claim 2 wherein said second means includes means for adding the respective outputs from said first and second detectors to obtain a signal representative of core vibration in a direction transverse to a line drawn between said detectors.

4. The nuclear reactor pressure vessel core component vibration monitor of claim 2 wherein said second means includes means for subtracting the respective outputs from said first and second detectors to obtain a signal representative of core vibration along the line of said detectors.

5. The nuclear reactor pressure vessel core component vibration monitor of claim 2 including:
    means for separating corresponding AC and DC components of the respective output signals of said first and second detectors; and
    means for normalizing the corresponding AC components to the respective DC components of said first and second detectors to remove the affect of reactor power on the resulting signal.

6. The nuclear reactor pressure vessel core component vibration monitor of claim 2 including:
    a thirs detector responsive to the neutron activity emanating from the core of a nuclear reactor to provide an electrical output representative thereof, said third detector positoned adjacent the core in spaced relationship to said first and second detectors along the periphery of the pressure vessel; and
    a fourth detector responsive to the neutron activity emanating from the core of a nuclear reactor to provide an electrical output representative thereof, said fourth detector positioned adjacent the core along the periphery of the pressure vessel diametrically opposite said third detector.

7. The nuclear reactor pressure vessel core component vibration monitor of claim 6 wherein the core diameter defined by said first and second detectors is oriented at right angles to the core diameter defined by said third and fourth detectors.

8. A method for measuring nuclear reactor pressure vessel core component vibration comprising the steps of:
    measuring the neutron activity emanating from the core of a nuclear reactor at at least two diametrically opposed spaced points around the periphery of the reactor core to obtain corresponding electrical signals representative thereof; and
    electrically processing the electrical signals indicative of the measurements obtained at said two spaced points to determine the amplitude and direction of core component vibration.

9. The method of claim 8 wherein said processing step includes the step of electrically subtracting the corresponding signals indicative of the measurements obtained at said two spaced points to obtain an out of phase signal representative of core vibration along the line drawn between said two diametrically opposed spaced points.

10. The method of claim 8 wherein said processing step includes the step of electrically adding the corresponding signals indicative of the measurements obtained at said two spaced points to obtain an in phase signal representative of core vibration in a direction transverse to a line drawn between said two diametrically opposed spaced points.

11. The method of claim 8 including the step of electrically normalizing the corresponding measurements obtained at said two spaced points with respect to the operating power level of the core.

* * * * *